(12) United States Patent
Nelson et al.

(10) Patent No.: US 11,789,682 B2
(45) Date of Patent: Oct. 17, 2023

(54) PRINTING 3D ANATOMICAL MODELS FOR DIAGNOSTIC AND NON-DIAGNOSTIC USES

(71) Applicants: Steven A. Nelson, San Jose, CA (US); Fred Herold, Boulder, CO (US); Ryan Hess, Cary, NC (US); Jeanette Wall, Warner Robins, GA (US); Patrick Gannon, Santa Rosa, CA (US); Gary Turner, Weston, FL (US)

(72) Inventors: Steven A. Nelson, San Jose, CA (US); Fred Herold, Boulder, CO (US); Ryan Hess, Cary, NC (US); Jeanette Wall, Warner Robins, GA (US); Patrick Gannon, Santa Rosa, CA (US); Gary Turner, Weston, FL (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/688,808

(22) Filed: Mar. 7, 2022

(65) Prior Publication Data
US 2023/0280958 A1 Sep. 7, 2023

(51) Int. Cl.
*G06F 3/12* (2006.01)
*B29C 64/393* (2017.01)
*G06F 21/60* (2013.01)
*B33Y 50/02* (2015.01)

(52) U.S. Cl.
CPC .......... *G06F 3/1267* (2013.01); *B29C 64/393* (2017.08); *G06F 3/1204* (2013.01); *G06F 3/1238* (2013.01); *G06F 3/1272* (2013.01); *G06F 21/608* (2013.01); *B33Y 50/02* (2014.12)

(58) Field of Classification Search
None
See application file for complete search history.

(56) References Cited

U.S. PATENT DOCUMENTS

| | | | |
|---|---|---|---|
| 8,639,484 B2 | 1/2014 | Sun et al. |
| 8,735,773 B2 | 5/2014 | Lang |
| 8,818,544 B2 | 8/2014 | Nehme et al. |
| 8,888,480 B2 | 11/2014 | Yoo et al. |
| 9,862,149 B2 | 1/2018 | Wang et al. |
| 10,143,555 B2 | 12/2018 | DeFelice et al. |
| 10,338,567 B2 | 7/2019 | Guimbretiere et al. |
| 10,399,374 B2 | 9/2019 | Kritchman |
| 10,433,858 B2 | 10/2019 | Zubrod |

(Continued)

FOREIGN PATENT DOCUMENTS

WO WO 2018/069736 A1 4/2018

OTHER PUBLICATIONS

Hess, U.S. Appl. No. 17/196,842, filed Mar. 9, 2021, Non-Final Rejection dated Nov. 23, 2022.

*Primary Examiner* — Frantz Bataille
(74) *Attorney, Agent, or Firm* — Hickman Becker Bingham Ledesma LLP

(57) ABSTRACT

Techniques for printing 3D anatomical models for diagnostic and/or non-diagnostic uses are provided. In one technique, a computing system (e.g., a 3D print portal) receives a first API call from a requester system via one or more APIs. The first API call indicates that a requester system has saved 3D printable files in a data repository. In response to receiving the first API call, the computing system sends, to the requester system, a user information form to initiate a production ordering process of printing the 3D printable files.

20 Claims, 6 Drawing Sheets

(56) References Cited

U.S. PATENT DOCUMENTS

| | | |
|---|---|---|
| 10,736,698 B2 | 8/2020 | Bohl |
| 10,765,658 B2 | 9/2020 | Estey et al. |
| 10,902,944 B1 | 1/2021 | Casey et al. |
| 11,033,336 B2 | 6/2021 | Bohl |
| 11,112,770 B2 | 9/2021 | Roh et al. |
| 2002/0059049 A1 | 5/2002 | Bradbury et al. |
| 2017/0157853 A1 | 6/2017 | Gallinaro et al. |
| 2017/0218660 A1 | 8/2017 | Muchna et al. |
| 2017/0235848 A1* | 8/2017 | Van Dusen ............ G06F 16/904 705/12 |
| 2022/0020223 A1* | 1/2022 | Van Bael .............. G06T 11/001 |
| 2022/0291660 A1* | 9/2022 | Hess .................. G05B 19/4099 |

\* cited by examiner

| Initiation | Custom Quoting | Engineering Services | Customer Approval | Print Production | Invoicing |

③ Initiate Order
Enter Information *
Order Number
O-2001
MRN Number
FE8307 ACC00
Accession Number
AC000-1
Purchase Order # *    — 402

Order Date
07/29/2021
Model Files Transfer Status
Complete
Organization
Baylor Scott & White Health
Hospital
Baylor Scott & White Cardiology Associates
Department
Cardiology Due Date    — 404

Typical lead time for the order is 5 business days after final approval of order Bill To    Expand Selection    — 406
Ship To    Expand Selection    — 408

Special Handling Instructions    — 410

[Cancel]                                    [Save] [Continue]

FIG. 4

PRINTING 3D ANATOMICAL MODELS FOR DIAGNOSTIC AND NON-DIAGNOSTIC USES

CROSS-REFERENCE TO RELATED APPLICATIONS

This application is related to U.S. patent application Ser. No. 17/196,842, filed Mar. 9, 2021, the entire contents of which are hereby incorporated by reference as if fully set forth herein.

This application is related to U.S. patent application Ser. No. 17/688,795, filed Mar. 7, 2022, the entire contents of which are hereby incorporated by reference as if fully set forth herein.

TECHNICAL FIELD

The present disclosure relates generally to printing and, more specifically, to a 3D print portal to assist in approving 3D printable files.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Technology for healthcare is a rapidly evolving market. Within this market, one of the quickest growing segments is the creation of patient-specific tools that help healthcare professionals personalize care to each individual. An example patient-specific tool is a 3D model, which is an exact replica of a specific part of a patient on which a surgeon will be operating. 3D models are beneficial in a number of ways. For example, surgeons can use the 3D models to show patients exactly what will be operated on so that the patients are well informed. In addition, surgeons can use these models to plan their surgery and achieve better results including less time spent in operating rooms and less chance for errors. Yet, creating and obtaining a printed anatomical part or any object is often a time-consuming and expensive process.

BRIEF DESCRIPTION OF THE DRAWINGS

In the drawings:

FIG. 4 is a screenshot of an example user interface for entering PO information, in an embodiment;

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

I. OVERVIEW
II. ARCHITECTURE OVERVIEW
   A. NETWORK
   B. REQUESTER SYSTEM
   C. REVIEWER CLIENT COMPUTING DEVICE
   D. DATA REPOSITORY
   E. IMAGE STORAGE
   F. MANAGER SERVER COMPUTING DEVICE
III. 3D PRINTING DATA FLOW
IV. 3D PRINTING DATA FLOW FROM PERSPECTIVE OF 3D PORTAL AND REPOSITORY
V. IMPLEMENTATION EXAMPLES

I. OVERVIEW

According to various embodiments, computer-implemented apparatuses, methods, and systems are provided for an electronic portal that provides capabilities for processing orders for 3D anatomical models. In one technique, a 3D print portal receives, from a requester system via one or more APIs, a first API call that the requester system has saved 3D printable files in a data repository. In response to receiving the first API call, the 3D print portal sends, to the requester system, a user interface form to initiate a production ordering process of printing the 3D printable files. Through the user interface form, a user is able to input various data items pertaining to printing a 3D anatomical model.

Embodiments allow healthcare professional users to have more flexibility in printing 3D anatomical models. A new 3D print portal interacts with existing image file viewing systems using an API. Technical benefits include ease of obtaining an accurate 3D anatomical model leveraging a new portal architecture.

II. ARCHITECTURE OVERVIEW

Figure 1:
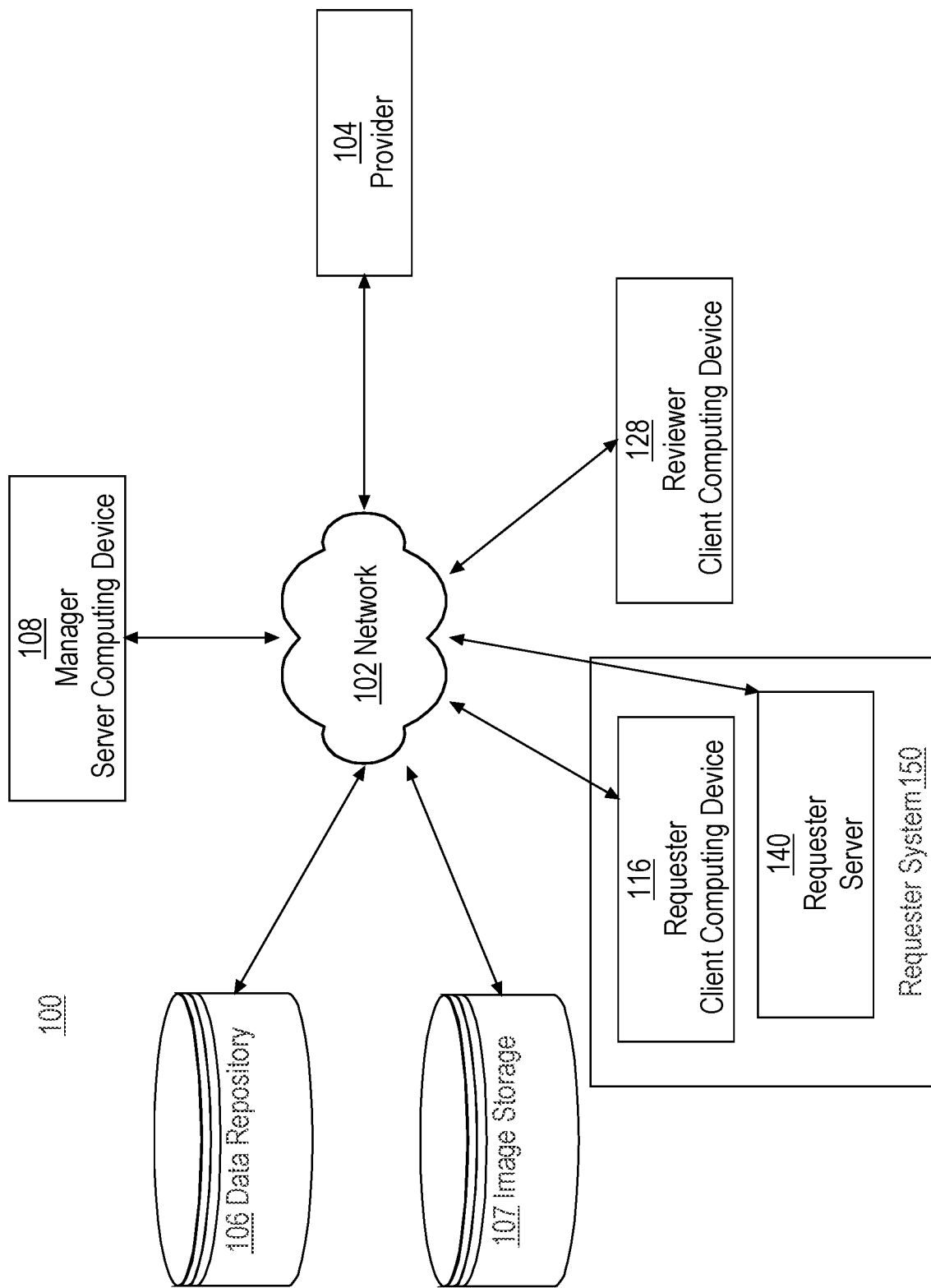
FIG. 1 depicts a networked computer system, according to an embodiment.

FIG. 1 depicts a networked computer system 100, according to an embodiment. In an embodiment, the computer system 100 comprises components that are implemented at least partially by hardware at one or more computing devices, such as one or more hardware processors executing program instructions stored in one or more memories for performing the functions that are described herein. All functions described herein are intended to indicate operations that are performed using programming in a special-purpose computer or general-purpose computer, in various embodiments. A "computer" or "computing device" may be one or more physical computers, virtual computers, and/or computing devices. As an example, a computer may be one or more server computers, cloud-based computers, cloud-based cluster of computers, virtual machine instances or virtual machine computing elements such as virtual processors, storage and memory, data centers, storage devices, desktop computers, laptop computers, mobile devices, and/or any other special-purpose computing devices. Any reference to "a computer" or "a computing device" herein may mean one or more computers, unless expressly stated otherwise. The instructions identified above are executable instructions and may comprise one or more executable files or programs that have been compiled or otherwise built based upon source code prepared in JAVA, C++, OBJECTIVE-C, or any other suitable programming environment.

Although components of FIG. 1 are depicted and described herein in one particular configuration, this is done for explanation purposes only and the components of FIG. 1 may be configured in any manner. In the example of FIG. 1, the networked computer system 100 includes one or more marketplace providers 104 (individually and collectively), a data repository 106, an image storage 107, a manager server computing device 108, one or more requester client computing devices 116 (individually and collectively), one or more requester servers 140, a requester system 150, and one or more reviewer client computing devices 128 (individually and collectively), all of which are communicatively coupled via a network 102.

FIG. 1 depicts only one of many possible arrangements of components configured to execute the programming described herein. Other arrangements may include fewer or different components, and the division of work between the components may vary depending on the arrangement. For example, as described below, image viewing, segmenting Digital Imaging and Communications In Medicine (DICOM) images and generating 3D printable files from segmented DICOM images may be performed on a requester client computing device 116 and/or on a requester server 140, while viewing and modifying 3D printable files may be performed on a reviewer client computing device 128. However, image viewing, segmenting DICOM images, generating 3D printable files from segmented DICOM images, and/or viewing and modifying 3D printable files may be performed on the manager server computing device 108, in an embodiment. Embodiments are described here in the context of the DICOM standard for purposes of explanation, but embodiments are not limited to the DICOM standard and are applicable to other standards.

A. NETWORK

The network 102 broadly represents a combination of one or more local area networks (LANs), wide area networks (WANs), metropolitan area networks (MANs), global interconnected internetworks, such as the public internet, or a combination thereof. Each such network may use or execute stored programs that implement internetworking protocols according to standards such as the Open Systems Interconnect (OSI) multi-layer networking model, including but not limited to Transmission Control Protocol (TCP) or User Datagram Protocol (UDP), Internet Protocol (IP), Hypertext Transfer Protocol (HTTP), and so forth. All components described herein may be configured to connect to the network 102 and the disclosure presumes that all components of FIG. 1 are communicatively coupled via network 102. The various components depicted in FIG. 1 may also communicate with each other via direct communications links that are not depicted in FIG. 1 for purposes of explanation.

B. REQUESTER SYSTEM

A requester system 150 comprises one or more requester client computing devices 116 and one or more requester servers 140. Each of the requester client computing device 116 and the requester server 140 are communicatively coupled to the network 102. Alternatively, the requester client computing device 116 and the requester server 140 are implemented on the same device. In other words, the requester system 150 may only comprise a single computing device.

Each of the requester client computing device 116 and the requester server 140 of FIG. 1 may be implemented by any type of computing device. The requester client computing device 116 and the requester server 140 are separate entities and may be geographically separated but may be configured to communicate with each other in a client-server relationship over a LAN or WAN. The requester server 140 may be implemented on one or more computing devices. Example implementations of the requester client computing device 116 include, without limitation, workstations, personal computers, laptop computers, tablet computers, personal digital assistants (PDAs), cellular telephony devices and any type of mobile devices.

Figure 2:
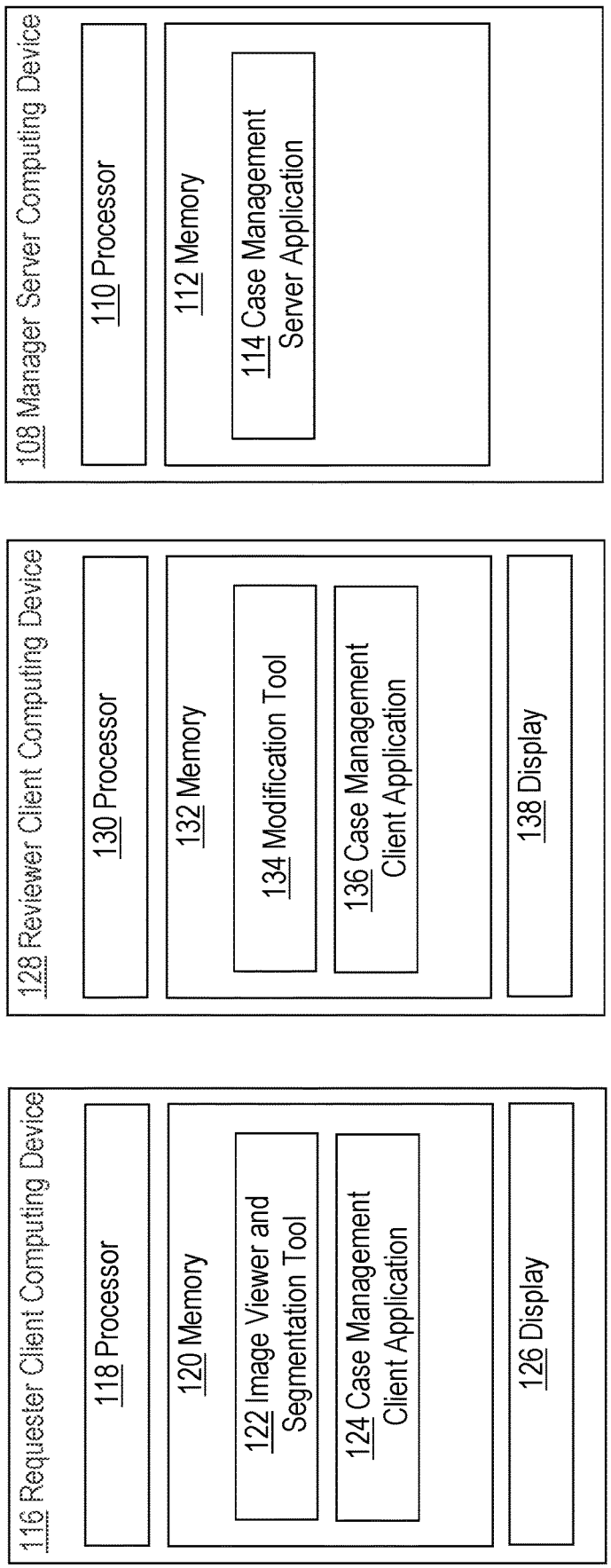
FIG. 2A depicts an example requester client computing device, according to an embodiment.
FIG. 2B depicts an example reviewer client computing device, according to an embodiment.
FIG. 2C depicts an example manager server computing device, according to an embodiment.

FIG. 2A depicts an example of the requester client computing device 116. The requester client computing device 116, operated by a healthcare professional user, includes a processor 118, memory 120 that includes an image viewer and segmentation tool 122 and a case management client application 124 executed by the processor 118, and a display 126.

The image viewer and segmentation tool 122 allows the healthcare professional user of the requester client computing device 116 to view and segment medical images and to generate 3D printable files from segmented medical images in collaboration with the requester server 140. An example of a viewer and segmentation tool 122 is the IBM iConnect® Access. Medical images may include medical images of anatomies. An example of a medical image is a DICOM image.

The case management client application 124 provides portal functionality that allows the healthcare professional of the requester client computing device 116 to submit a 3D print request, transfer (e.g., upload, download) and view data, such as DICOM images and/or 3D printable files, and communicate with an application engineer user(s) regarding production requirements (e.g., messaging, video chatting, etc.) in collaboration with the requester server 140. The 3D print request includes print data for an object to be 3D printed. The print data may include a description of the object to be 3D printed, printing specifications, requester information, patient information, shipping information, billing information, or a combination thereof. 3D printable files may be STL (Standard Tessellation Language or STereoLithography) files, 3MF (3D Manufacturing Format) files, or other files suitable for 3D printing.

In an embodiment, installation of application-specific client software (e.g., case management client application 124) is not required. For example, an embodiment may use a browser to communicate with a compatible HTTP server at the manager server computing device 108. For another example, an embodiment may use application programming interfaces (APIs) to allow the image viewer and segmentation tool 122 to exchange data with a case management server application at the manager server computing device 108 without leaving the image viewer and segmentation tool 122. Examples of an API that may be implemented include an HTTP API, a REST API, and a Web API.

C. REVIEWER CLIENT COMPUTING DEVICE

A reviewer client computing device 128 of FIG. 1 may be implemented by any type of computing device. Example implementations of reviewer client computing device 128 include, without limitation, workstations, personal computers, laptop computers, tablet computers, personal digital assistants (PDAs), cellular telephony devices and any type of mobile devices.

FIG. 2B depicts an example reviewer client computing device 128. The reviewer client computing device 128, operated by an application engineer user, includes a processor 130, memory 132 that includes a modification tool 134 and a case management client application 136 executed by the processor 130, and a display 138.

The modification tool 134 allows the application engineer user of the reviewer client computing device 128 to view and modify 3D printable files, which may be STL files, 3MF files, or other files suitable for 3D printing.

The case management client application 136 provides portal functionality that allows an application engineer professional of the reviewer client computing device 128 to transfer (e.g., upload, download) and view data, such as DICOM images and/or 3D printable files, communicate with a healthcare professional user(s) regarding production requirements (e.g., messaging, video chatting, etc.).

In an embodiment, installation of application-specific client software (e.g., case management client application 136) is not required. For example, an embodiment may use a browser to communicate with a compatible HTTP server at the manager server computing device 108. For another example, an embodiment may use application programming interfaces (APIs) to allow the modification tool 134 to exchange data with a case management server application at the manager server computing device 108 without leaving the modification tool 134.

D. DATA REPOSITORY

A data repository 106 of FIG. 1 may include one or more databases. As used herein, the term "database" refers to a corpus of data, organized or unorganized, in any format, with or without a particular interface for accessing the corpus of data.

The data repository 106 may include an entity database. The entity database includes records of entities (e.g., healthcare professional users, healthcare organizations associated with healthcare professional users, application engineer users, engineering organizations associated with application engineer users, etc.). Each entity record may be created in response to an entity account setup (e.g., registration with the manager server computing device 108) and may contain contact information and authentication information for an entity.

The data repository 106 may include a case database. The case database includes records of cases. A case may refer to a medical matter or another type of matter. Each case record may be created in response to receiving a 3D print request submitted from the requester system 150 (e.g., the requester client computing device 116 or the requester server 140) and may contain print data, an initial version of a collection of one or more 3D printable files, any modified version of the collection of the one or more 3D printable files are stored in the data repository 106, quote data, invoice data, and other information relating to the request. Each case record of the case database may be associated with one or more entity records (e.g., record of requester and/or record of reviewer) of the entity database.

In an embodiment, the initial version of the collection of the one or more 3D printable files of the object may be provided at the requester client computing device 116, the requester server 140, the reviewer client computing device 128, or the manager server computing device 108. Similarly, a modified version of the collection of the one or more 3D printable files of the object may be provided at the requester client computing device 116, the requester server 140, the reviewer client computing device 128, or the manager server computing device 108.

The data repository 106 may include one or more other databases storing additional information that may be used by one or more components of the system 100. For example, data repository 106 may include a database used by a 3D print portal (described herein) to store production order and related information.

Databases may be co-located in a single data repository or may be separately located in different data repositories. Furthermore, although the data repository 106 is shown in FIG. 1 as a component separate from other components of FIG. 1, the data repository 106 may be part of another component, such as the manager server computing device 108.

E. IMAGE STORAGE

An image storage 107 of FIG. 1 may include one or more databases. Image storage 107 stores DICOM images and is accessible to a DICOM viewer, such as the requester client computing device 116 (and, optionally, an associated server). Thus, the DICOM viewer loads DICOM data from image storage 107 and presents the DICOM data on a screen of a computing device. The image storage 107 may be part of a patient archiving (PAC) system, which may be part of a hospital or group of hospitals.

F. MANAGER SERVER COMPUTING DEVICE

The manager server computing device 108 of FIG. 1 broadly represents one or more computers, such as one or more desktop computers, server computers, a server farm, a cloud computing platform (like Amazon EC2, Google Cloud, container orchestration (Kubernetes, Docker, etc.), or a parallel computer, virtual computing instances in public or private datacenters, and/or instances of a server-based application. In an embodiment, the manager server computing device 108 is in communication with the requester system, one or more data repositories 106, and one or more reviewer client computing devices 128. In one embodiment, the manager server computing device 108 is not in direct communication with the image storage 107. Instead, the manager server computing device 108 interacts with the requester system 150 in order to access images in the image storage 107. In an alternative embodiment, the manager server computing device 108 is in direct communication with the image storage 107.

FIG. 2C depicts an example manager server computing device 108. The manager server computing device 108 includes a processor 110 and memory that includes a case management server application 114 executed by the processor 110. The case management client application 124, 136 executing on the client computing devices 116, 128 and the case management server application 114 executing on the manager server computing device 108 provide portal functionality that allows healthcare professional users and application engineer users to communicate with each other, to access and transfer data, etc., and version control functionality that allows healthcare professional users and application engineer users to access one or more versions of a collection of one or more 3D printable files.

The case management server application 114 of the manager server computing device 108 may be organized using a plurality of instructions, such as interfacing instructions, verification instructions, receiving and sending instructions, storing and retrieving instructions, alerting instructions, approving instructions, transferring instructions, and performing instructions.

The interfacing instructions may be programmed to interface, using APIs, with one or more image viewer and segmentation tools 122, with one or more modification tools 134, and/or with one or more providers 104 to exchange data.

The verification instructions may be programmed to authenticate users of client computing devices 116, 128 (and by extension, client computing devices 116, 128) verifying authentication data (e.g., username/password) provided by the client computing devices 116, 128 against authentication information stored in the entity database.

The receiving and sending instructions may be programmed to transmit data with authenticated client computing devices 116, 128 and/or one or more providers 104. Example data being transmitted include messages between a requester client computing device 116 and a reviewer client computing devices 128, different versions of a collection of one or more 3D printable files, approval indications, alerts, notifications, etc.

The storing and retrieving instructions may be programmed to store data in and retrieve data from a data repository. For example, messages transmitted by client computing devices 116, 128 and different versions of a collection of one or more 3D printable files may be stored in the data repository 106 of FIG. 1.

The transferring instructions may be programmed to transfer a new version of a collection of one or more 3D printable files to the requester server 140 for review in response to receiving an instruction (e.g., a click) from the reviewer client computing device 128.

The alerting instructions may be programmed to generate alerts, notifications, and emails to inform users of new data received. For example, an email may be generated and sent to a healthcare professional user informing the healthcare professional user that a new version of a collection of one or more 3D printable files is available for review. For another example, an email may be generated and sent to an application engineer user informing the application engineer user that feedback regarding the new version of the collection of one or more 3D printable files has been received.

The approving instructions may be programmed to "lock down" a particular version of the collection of one or more 3D printable files in response to receiving an approval indication for the particular version that has been approved by the healthcare professional user. The particular version may or may not be the latest version stored in the data repository 106. When the particular version is locked down, the particular version may be visually differentiated from other versions of the collection.

The performing instructions may be programmed to perform a plurality of tasks. Some of the plurality of tasks may be performed prior to the particular version being locked down, while others may be performed after the particular version of the collection is locked down.

An example task performed prior to the particular version being locked down is causing to generate a digital quote data. The digital quote data defines an electronic quote for 3D printing. The digital quote data may be transmitted to the requester client computing device 116, or to another computing device as specified in the print data, for approval prior to alerting the application engineer user of an initial version of the collection.

An example task performed after the particular version is locked down is causing to 3D print an object according to the particular version. Another example task performed after the particular version is locked down is causing to generate a digital invoice data. The digital invoice data defines an electronic payment invoice for the printed 3D object. The digital invoice data may be thereafter transmitted to the requester client computing device 116, or to another computing device as specified in the print data.

Other tasks are contemplated. In an embodiment one or more tasks may be completed by one or more providers 104 of FIG. 1. For example, 3D printing may be completed by a 3D printing service provider, or invoicing may be completed by an accounting service provider.

III. 3D PRINTING DATA FLOW

Figure 3:
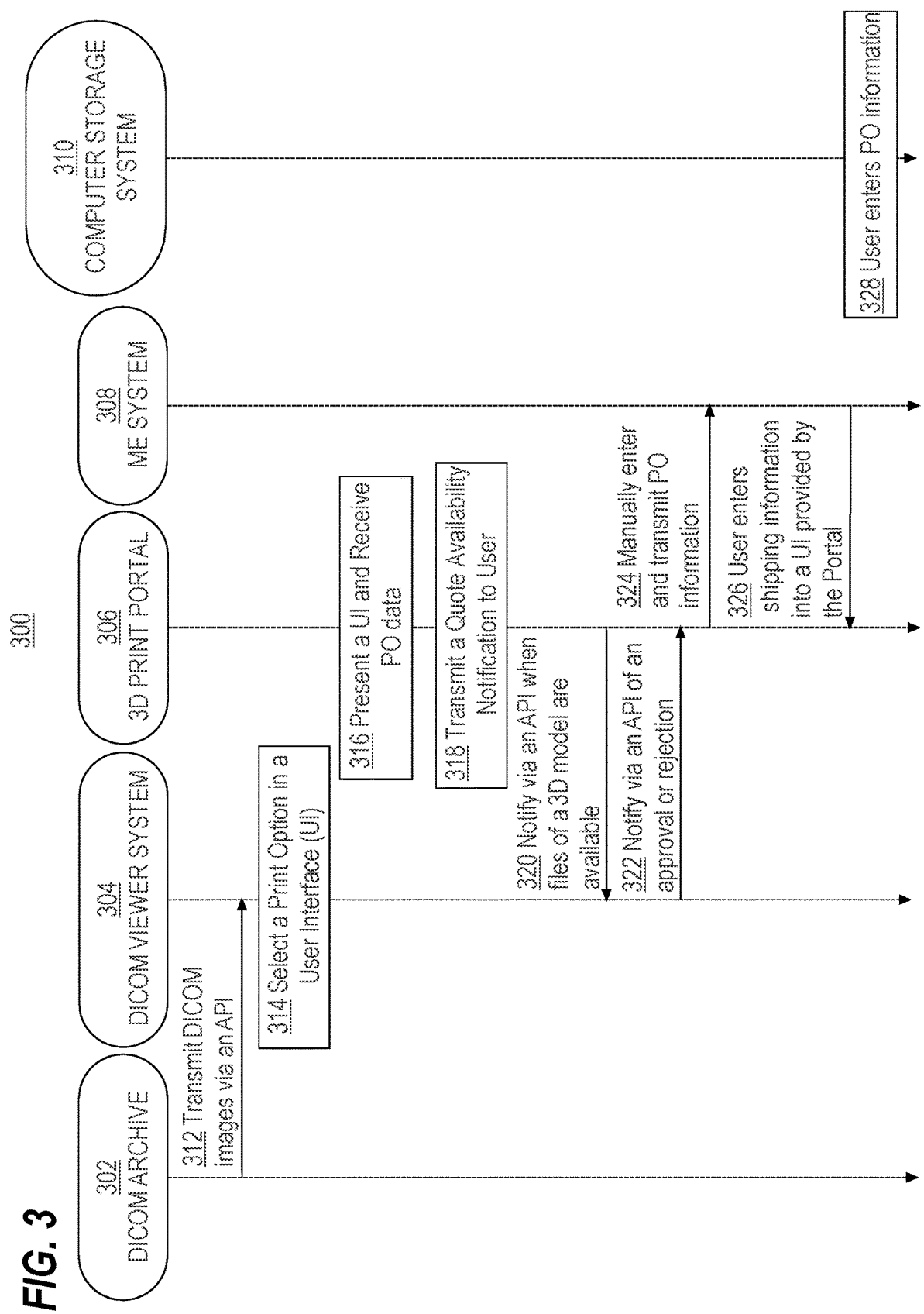
FIG. 3 is a data flow diagram that depicts an example process for printing a 3D anatomical model, in an embodiment.

FIG. 3 is a data flow diagram that depicts an example process 300 for printing a 3D anatomical model, in an embodiment. FIG. 3 depicts five different entities: a DICOM archive 302, a DICOM viewer system 304, a 3D print portal 306, a manufacturing engineering (ME) system 308, and a computer storage system 310, which may be affiliated with the 3D print portal 306, or managed by the same entity that manages 3D print portal 306. Each step of process 300 may comprise one or more sub-steps or operations.

DICOM archive 302 may be part of a patient archiving (PAC) system. DICOM archive 302 stores DICOM images (and is accessible to DICOM viewer system 304). An example of the DICOM viewer system 304 is the requester system. In an embodiment, the manager server computing device 108 is a server of the 3D print portal 306. 3D print portal 306 has access to a may or may not have access to DICOM archive 302.

At step 312, the DICOM archive 302 transmits a set of one or more DICOM images to the DICOM viewer system 304 via an API. Step 312 may be performed in response to the DICOM viewer system 304 transmitting a DICOM image request via an API. The DICOM viewer system 304 may present a user interface on a screen of a computing device which user interface allows a healthcare professional user to search DICOM images (stored in the DICOM archive 302) based on user and based on study. Example search criteria that a user may submit via the user interface include last name, first name, patient ID, accession number, date range of study, and modality. In response to the performance of a search based on the search criteria, the user interface is updated to include a set of search results, each search result including a study date, a modality (e.g., CT scan), a patient name (here, the patient names are anonymized), a patient identifier (ID), a description, an accession, a referring physician, and a number of images. Any of the search results may be selected.

In response to selecting a study (or one of the search results), a second user interface may be presented. A selected study may include multiple image series, each of which is user selectable. The second ser interface may allow a user to select a mode from among multiple modes, such as a 3D printing mode, calcium scoring, curved MPR, 3D 6:1 Layout, and 3D 4:1 Layout. As a result of user selection of the 3D printing mode, the second user interface 420 may be updated with segmentation options, including multiple navigation panes, one of which may provide a perspective of a 3D object (e.g., a human skull that is different than other perspectives of the same skull). Within a navigation pane, the user might select a portion of an image depicting the 3D object. Based on the selected portion, the DICOM viewer system 304 segments that portion and updates a preview pane to present an example of what a 3D printed model might look like.

At step 314, a user/customer operating a computing device associated with the DICOM viewer system 304 selects a print option with respect to 3D printable files that are based on the set of one or more DICOM images.

Thus, the second user interface may include a "send to print" button (an example of the print option), which, when selected, causes DICOM viewer system 304 to interact with 3D print portal 306.

Each DICOM file is designed to be standalone. In other words, all the information needed to identify a DICOM file is embedded in the file's header. This information is organized into four levels of hierarchy: patient, study, series, and instance. "Patient" is the person receiving the exam. "Study"

is the imaging procedure being performed, at a certain date and time, in the hospital. Regarding "series," each study comprises multiple series. A series may represent the patient being physically scanned multiple times in one study, such as for MRIs. Alternatively, a series may represent a patient being scanned once and that data is reconstructed in different ways, such as for CT scans. Regarding "instance," every slice of a 3D image is treated as a separate instance. In this context, "instance" is synonymous with the DICOM file itself.

In response to user selection of the print option, multiple data items are transmitted to the 3D print portal 306. Examples of those data items include a patient ID, an accession number of a study, a study instance UID, a series instance UID, and a 3D model name. The 3D model name may be free text that is entered by the user/customer. The other data items may be automatically transmitted without any user input to specify them as part of the user selection of the print option. Also, in response to user selection of the print option, the 3D printable files (e.g., STL files and associated metadata) are transferred to cloud object storage (e.g., data repository 106).

At step 316, the user/customer is presented with a user interface (or production order initiation form) and enters production order (PO) information. Step 316 may be performed in response to the transmission of the multiple data items in step 314 to 3D print portal 306. This user interface is provided by 3D print portal 306. The PO information may include a shipping address, a billing address, a model type, an order number, and/or special handling instructions. FIG. 4 is a screenshot of an example user interface 400 comprising a form for entering this PO information. User interface 400 includes a PO field 402, a due date field 404, a bill to field 406, a ship to filed 408, and a special handing instructions field 410.

At step 318, 3D print portal 306 transmits a notification to a computing device of the user/customer when a price quote is available for viewing via 3D print portal 306. The notification may be an email message, an SMS text message, or a software application notification. The user/customer will eventually provide input indicating whether the quote is approved or rejected. The notification may be a text message, an email message, or a notification via a software application.

At step 320, in a scenario where one or more files of the 3D printable files are modified, the modified 3D printable files are transferred to a DICOM server included in the DICOM viewer system for a customer's approval. The 3D print portal 306 notifies the DICOM viewer system 304 (or a server associated therewith) via an API when the modified 3D printable files are available.

At step 322, the DICOM viewer system 304 transmits an approval or rejection notification to the 3D print portal 306 via an API. The notification may include notes from the customer regarding the approval or rejection.

At step 324, upon receiving an approval, the 3D print portal 306 transmits PO information to the ME system 308. Step 324 may be implemented using an API call from the 3D print portal 306 to ME system 308. The PO information may include the 3D printable files (e.g., STL files and associated metadata), shipping and billing addresses, contact person(s), portal order ID, pricing, order number, and a (proprietary) product code. Some of this PO information may have been automatically retrieved from storage (e.g., data repository 106) based on PO information previously entered manually. Some of the PO information may have been manually entered after step 322, such as contact person(s) and product code. In an alternative embodiment, instead of an API call, the PO information is manually entered into the ME system 308, including the 3D printable files (downloaded from the 3D print portal 306 and uploaded into the ME system 308.

At step 326, a user of the ME system 308 manually enters shipping information into a user interface provided by the 3D print portal 306.

The 3D print portal 306 and the computer storage system 310 are communicatively coupled. An ongoing synchronization of these two systems occurs via an API in order to synchronize shipping addresses, billing address, and contact information so that the computer storage system 310 has up-to-date information.

At step 328, a production order is entered into the computer storage system 310 for billing. Step 328 may be a manual process. Alternatively, step 328 involves ME system 308 calling an API in the computer storage system 310 in order to automate the process.

IV. 3D PRINTING DATA FLOW FROM PERSPECTIVE OF 3D PORTAL AND REPOSITORY

Figure 5:
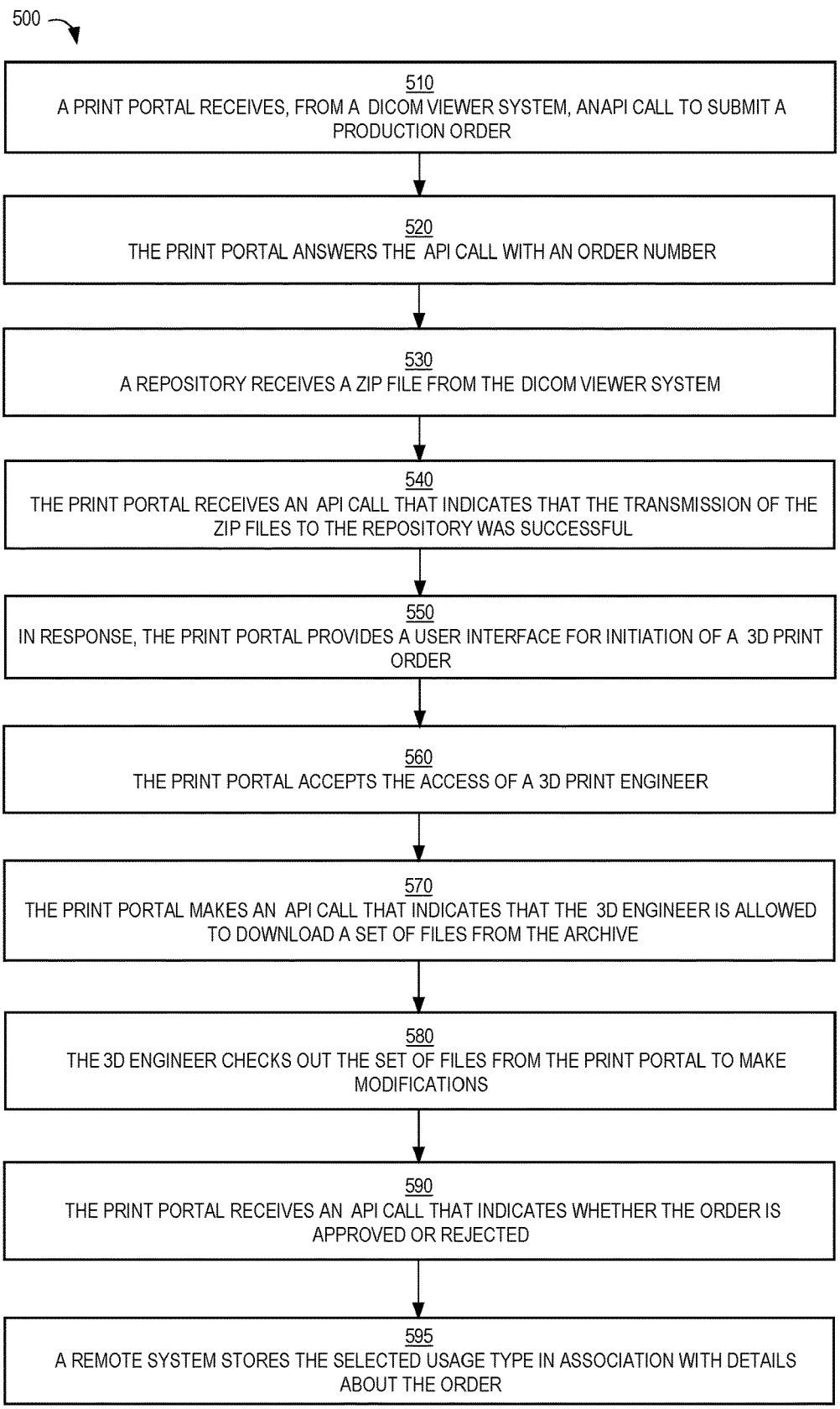
FIG. 5 is a flow diagram that depicts an example process, from the perspective of a print portal and a repository, for printing a 3D model, in an embodiment.

FIG. 5 is a flow diagram that depicts an example process 500 for printing a 3D model from the perspective of a print portal and a repository, in an embodiment. Thus, some steps of process 500 may be performed by the print portal while other steps may be performed by the repository. The first set of steps of process 500 (i.e., steps 510-550) comprise an order process, while the second set of steps of process 500 (i.e., steps 560-590) comprise an engineering process. Each step of process 500 may comprise one or more sub-steps or operations. An example of the print portal is the 3D print portal 306 and an example of the repository is the data repository 106 and is associated with the print portal. In an embodiment, the print portal does not communicate with the archive.

At step 510, the print portal receives an API call from the DICOM viewer system 304 to submit an order. Specifically, the API call is from the DICOM viewer system 304 to a server associated with the print portal. The DICOM server hosts the web application that is the DICOM viewer. The API call may include validation data, such as an email address. The validation data is used to validate the user requesting the printing of a 3D anatomical model is a valid user in the print portal.

At step 520, the print portal answers the API call with an order number. The order number may be a randomly-generated number or a number that is monotonically increasing based on previously-generated order numbers (e.g., portal order ID). If the former, then a check may be performed to determine whether the randomly-generated number has already been used for a previous order. If so, then another number is randomly generated.

At step 530, the repository receives a zip file from the DICOM viewer system. The zip file may contain STL files that were generated based on DICOM images, user input, and execution of a segmentation tool integrated in the DICOM server. After the segmentation has been performed using the DICOM server, the 3D printable files along with the order data are saved and managed by the print portal in the repository (e.g., data repository 106).

At step 540, the print portal receives an API call (e.g., from the DICOM viewer system) indicating that the transmission of the zip files to the repository was successful.

At step 550, in response to the API call of step 540, the print portal provides a user interface for initiation of a 3D print order. A user of the DICOM viewer inputs data and/or making selections in the user interface and, ultimately, selects an option to submit the inputted/selected data.

At step 560, the print portal grants, to a 3D print engineer, access to the 3D printable files. The 3D engineer is a user who is operating another client computing device (e.g., a reviewer client computing devie 128). Step 560 may involve receiving (device or user) credentials of the 3D print engineer (e.g., username and password) and verifying that the credentials are valid, for example, by accessing a database. The 3D engineer may access the print portal using a web browser executing on the computing device.

At step 570, the print portal makes an API call that indicates that the 3D print engineer is allowed to download a set of one or more files (for review) from the repository. For example, the 3D engineer accessing the print portal, using a web browser, checks out the 3D printable files, which are then downloaded in the web browser to the 3D engineer's local hard disk. An internal API is then used to download the 3D printable files from its storage location. Step 570 may be performed immediately and in response to step 560.

At step 580, the 3D engineer uses a client of the print portal (e.g., a web application) to check out the 3D printable files to make any modifications needed. The 3D print engineer (e.g., employed or directed by the entity that provides the print portal) may review the 3D printable files and determine whether the files (e.g., images and/or metadata) are of sufficient quality to print/manufacture an accurate 3D anatomical model. When the modifications are completed, the 3D engineer again uses the client of the print portal to check the 3D printable files model back into a server of the print portal, which server stores the new version of the 3D printable files in the data repository. If all the modifications have been completed, then the 3D engineer may click a link in the client of the print portal, which causes a notification to be transmitted to a doctor or technician in a hospital via one or more of email, text, or other notification ways. The print portal makes an API call that indicates that the new version of the 3D printable files is to be transferred to the requester system 150 so that a doctor can review and approve or reject the modifications using the requester system 150.

At step 590, the print portal receives an API call that indicates whether the order is approved or rejected. A doctor or technician in a hospital would approve/reject the 3D printable files and offer comments. The API call may include comments from the 3D print engineer. The API call in step 590 may originate from the DICOM server.

At step 595, the print portal initiates the 3D printing process if the API call in step 590 indicates that the order is approved. In other words, after the 3D printable files are approved in the DICOM viewer, the 3D printable files then move to the ME system for production. This moving may be a manual process or an API call to transfer the 3D printable files from the print portal to the ME system.

V. EXAMPLES

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system according to embodiments and examples described herein.

A first clause is a computing system, the computing system including one or more processors, one or more storage media or memories coupled to the one or more processors and storing instructions which, when processed or executed by the one or more processors, cause: receiving, from a requester system via one or more APIs, a first API call that a requester system has saved 3D printable files in a data repository; and in response to receiving the first API call, sending, to the requester system, a user interface form to initiate production ordering process of printing the 3D printable files.

A further clause is the computing system of the first clause where the instructions, when processed by the one or more processors, further cause: uploading revised 3D printable files to the data repository using the one or more APIs; and sending, to the requester system, a second API call that an update has been made to the 3D printable files.

A further clause is the computing system of the previous clause where the instructions, when processed by the one or more processors, further cause receiving, from the requester system, a third API call that indicates that the update is approved.

A further clause is the computing system of the first clause where the instructions, when processed by the one or more processors, further cause, prior to receiving the first API call: receiving, from the requester system, a second API call to submit a production order; in response to receiving the second API call, sending, to the requester system, an order number.

A further clause is the computing system of the first clause where the instructions, when processed by the one or more processors, further cause, based on credentials received from a reviewer device, determining whether to grant, to the reviewer device, access to the 3D printable files.

A further clause is the computing system of the previous clause where the instructions, when processed by the one or more processors, further cause transmitting a second API call that indicates that a user of the reviewer device is granted access to the 3D printable files for review.

A further clause is the computing system of the previous clause where the instructions, when processed by the one or more processors, further cause receiving a third API call that indicates whether the 3D printable files are approved for 3D printing.

A further clause is the computing system of the first clause where the instructions, when processed by the one or more processors, further cause: synchronizing, via an API, with a database system that is separate from the computing device and the requester system, production data that comprises mailing addresses and contact information.

A second clause is a computer-implemented method comprising: receiving, from a requester system via one or more APIs, a first API call that a requester system has saved 3D printable files in a data repository; and in response to receiving the first API call, sending, to the requester system, a user interface form to initiate a production ordering process of printing the 3D printable files.

A further clause is the method of the second clause, further comprising: uploading revised 3D printable files to the data repository using the one or more APIs; and sending, to the requester system, a second API call that an update has been made to the 3D printable files.

A further clause is the method of the previous clause, further comprising receiving, from the requester system, a third API call that indicates that the update is approved.

A further clause is the method of the second clause, further comprising, prior to receiving the first API call:

receiving, from the requester system, a second API call to submit a production order; in response to receiving the second API call, sending, to the requester system, an order number.

A further clause is the method of the second clause, further comprising, based on credentials received from a reviewer device, determining whether to grant, to the reviewer device, access to the 3D printable files.

A further clause is the method of the previous clause, further comprising transmitting a second API call that indicates that a user of the reviewer device is granted access to the 3D printable files for review.

A further clause is the method of the previous clause, further comprising receiving a third API call that indicates whether the 3D printable files are approved for 3D printing.

A further clause is the method of the second clause, further comprising: synchronizing, via an API, with a database system that is separate from the computing device and the requester system, production data that comprises mailing addresses and contact information.

A third clause is one or more storage media storing instructions which, when processed or executed by one or more processors, cause: receiving, from a requester system via one or more APIs, a first API call that the requester system has saved 3D printable files in a data repository; and in response to receiving the first API call, sending, to the requester system, a user interface form to initiate a production ordering process of printing the 3D printable files.

A further clause is the storage media of the third clause where the instructions, when processed by the one or more processors, further cause: uploading revised 3D printable files to the data repository using the one or more APIs; and sending, to the requester system, a second API call that an update has been made to the 3D printable files.

A further clause is the storage media of the previous clause where the instructions, when processed by the one or more processors, further cause receiving, from the requester system, a third API call that indicates that the update is approved.

A further clause is the storage media of the third clause where the instructions, when processed by the one or more processors, further cause, prior to receiving the first API call: receiving, from the requester system, a second API call to submit a production order; in response to receiving the second API call, sending, to the requester system, an order number.

A further clause is the storage media of the third clause where the instructions, when processed by the one or more processors, further cause, based on credentials received from a reviewer, determining whether to grant, to the reviewer device, access to the 3D printable files.

A further clause is the storage media of the previous clause where the instructions, when processed by the one or more processors, further cause transmitting a second API call that indicates that a user of the reviewer device is granted access to the 3D printable files for review.

A further clause is the storage media of the previous clause where the instructions, when processed by the one or more processors, further cause receiving a third API call that indicates whether the 3D printable files are approved for 3D printing.

A further clause is the storage media of the third clause where the instructions, when processed by the one or more processors, further cause: synchronizing, via an API, with a database system that is separate from the computing device and the requester system, production data that comprises mailing addresses and contact information.

VI. IMPLEMENTATION EXAMPLES

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
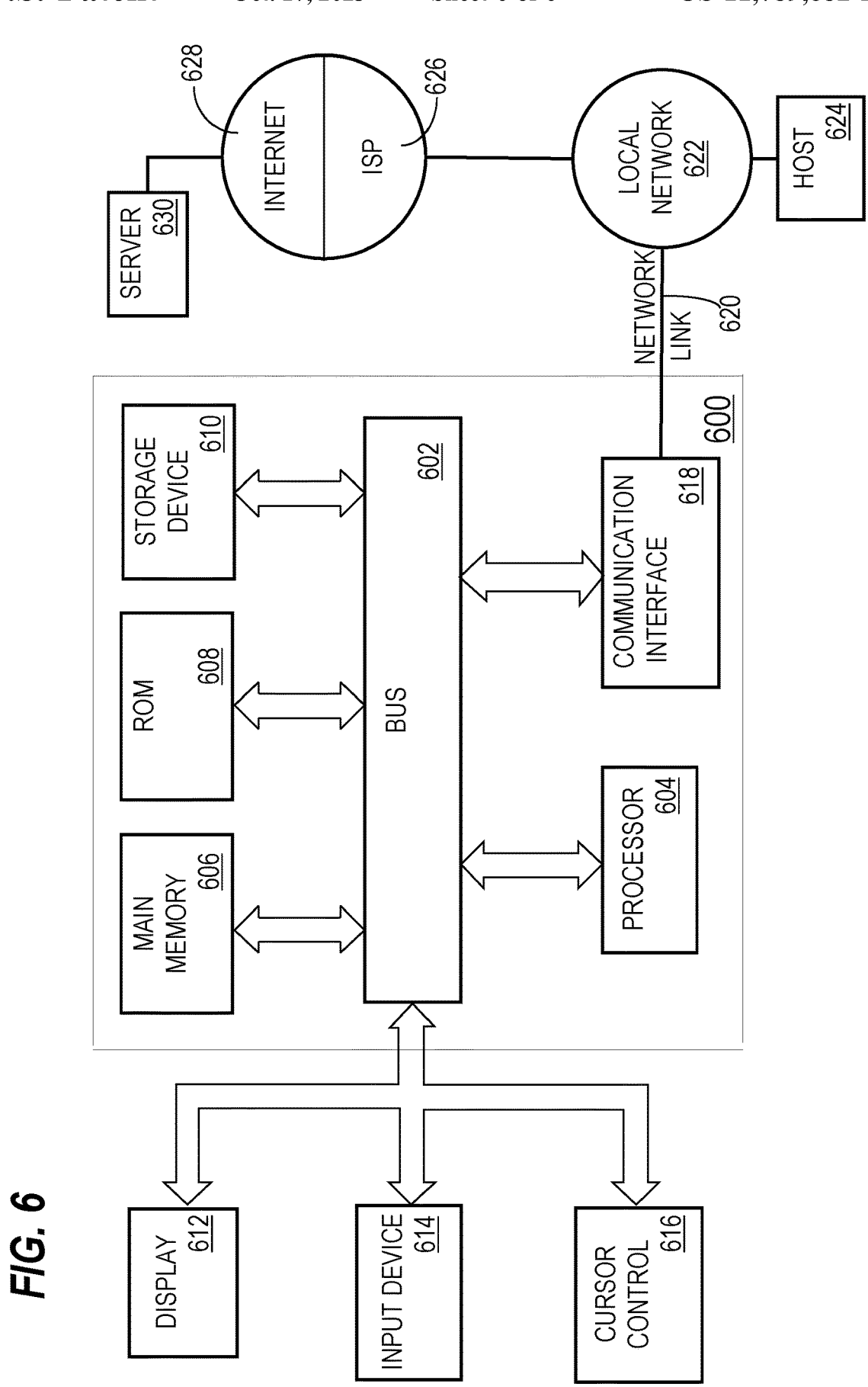
FIG. 6 is a block diagram that illustrates a computer system upon which an embodiment of the invention may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk, optical disk, or solid-state drive is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 610. Volatile media includes dynamic memory, such as main memory 606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computing system comprising:
   one or more processors; and
   one or more memories storing instructions which, when processed by the one or more processors, cause:
      receiving, from a requester system via one or more APIs, a first API call that the requester system has saved 3D printable files in a data repository; and
      in response to receiving the first API call that indicates that the requester system has saved 3D printable files in the data repository, sending, to the requester system, a user interface form to initiate a production ordering process of printing the 3D printable files.

2. The computing system of claim 1, wherein the instructions, when processed by the one or more processors, further cause:
   uploading revised 3D printable files to the data repository using the one or more APIs;
   sending, to the requester system, a second API call that an update has been made to the 3D printable files.

3. The computing system of claim 2, wherein the instructions, when processed by the one or more processors, further cause:
   receiving, from the requester system, a third API call that indicates that the update is approved.

4. The computing system of claim 1, wherein the instructions, when processed by the one or more processors, further cause, prior to receiving the first API call:
   receiving, from the requester system, a second API call to submit a production order;
   in response to receiving the second API call, sending, to the requester system, an order number.

5. The computing system of claim 1, wherein the instructions, when processed by the one or more processors, further cause:
   based on credentials received from a reviewer device that is different than the computing system and the requester system, determining whether to grant, to the reviewer device, access to the 3D printable files.

6. The computing system of claim 5, wherein the instructions, when processed by the one or more processors, further cause:
transmitting a second API call that indicates that a user of the reviewer device is granted access to the 3D printable files for review.

7. The computing system of claim 6, wherein the instructions, when processed by the one or more processors, further cause:
receiving a third API call that indicates whether the 3D printable files are approved for 3D printing.

8. The computing system of claim 1, wherein the instructions, when processed by the one or more processors, further cause:
synchronizing, via an API, with a database system that is separate from the computing system and the requester system, production data that comprises mailing addresses and contact information.

9. A method comprising:
receiving, from a requester system via one or more APIs, a first API call that the requester system has saved 3D printable files in a data repository; and
in response to receiving the first API call that indicates that the requester system has saved 3D printable files in the data repository, sending, to the requester system, a user interface form to initiate a production ordering process of printing the 3D printable files;
wherein the method is performed by one or more computing devices.

10. The method of claim 9, further comprising:
uploading revised 3D printable files to the data repository using the one or more APIs;
sending, to the requester system, a second API call that an update has been made to the 3D printable files.

11. The method of claim 10, further comprising:
receiving, from the requester system, a third API call that indicates that the update is approved.

12. The method of claim 9, further comprising, prior to receiving the first API call:
receiving, from the requester system, a second API call to submit a production order;
in response to receiving the second API call, sending, to the requester system, an order number.

13. The method of claim 9, further comprising:
based on credentials received from a reviewer device, determining whether to grant, to the reviewer device, access to the 3D printable files.

14. The method of claim 13, further comprising:
transmitting a second API call that indicates that a user of the reviewer device is granted access to the 3D printable files for review.

15. The method of claim 14, further comprising:
receiving a third API call that indicates whether the 3D printable files are approved for 3D printing.

16. The method of claim 9, further comprising:
synchronizing, via an API, with a database system that is separate from a computing system that performs the method and the requester system, production data that comprises mailing addresses and contact information.

17. One or more storage media storing instructions which, when executed by one or more processors, cause:
receiving, from a requester system via one or more APIs, a first API call that the requester system has saved 3D printable files in a data repository; and
in response to receiving the first API call that indicates that the requester system has saved 3D printable files in the data repository, sending, to the requester system, a user interface form to initiate a production ordering process of printing the 3D printable files.

18. The one or more storage media of claim 17, wherein the instructions, when processed by the one or more processors, further cause:
uploading revised 3D printable files to the data repository using the one or more APIs;
sending, to the requester system, a second API call that an update has been made to the 3D printable files.

19. The one or more storage media of claim 17, wherein the instructions, when processed by the one or more processors, further cause, prior to receiving the first API call:
receiving, from the requester system, a second API call to submit a production order;
in response to receiving the second API call, sending, to the requester system, an order number.

20. The one or more storage media of claim 17, wherein the instructions, when processed by the one or more processors, further cause:
based on credentials received from a reviewer device, determining whether to grant, to the reviewer device, access to the 3D printable files.

* * * * *